3,474,103
Patented Oct. 21, 1969

3,474,103
SUBSTITUTED 7-ACRYLOYL - 7,8 - DIHYDRO-6-(HYDROXY OR METHOXY)-6,14-ENDO(ETHENO OR ETHANO) CODIDES AND MORPHIDES
John Johnston Brown, Pearl River, N.Y., and Robert Allis Hardy, Jr., Ridgewood, N.J., assignors to American Cyanamid Company, Stamford, Conn., a corporation of Maine
No Drawing. Filed Dec. 8, 1967, Ser. No. 688,977
Int. Cl. C07d 43/32, 99/04; A61k 27/00
U.S. Cl. 260—285                                9 Claims

ABSTRACT OF THE DISCLOSURE

This disclosure describes compounds of the class of substituted 7 - acryloyl - 7,8 - dihydro-6-(hydroxy or methoxy)-6,14-endo(etheno or ethano)codides and morphides which possess analgesic activity.

BRIEF SUMMARY OF THE INVENTION

This invention relates to novel substituted 7-acryloyl-7,8-dihydro-6-(hydroxy or methoxy)-6,14-endo(etheno or ethano)codides and morphides and to methods of preparing these compounds. The novel compounds of the present invention may be represented by the following general formula:

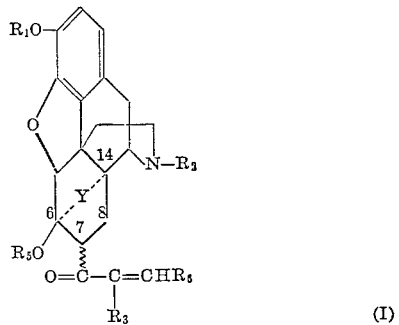

wherein $R_1$ is hydrogen, lower alkyl or lower alkanoyl; $R_2$ is hydrogen, propargyl, lower alkyl, phenyl lower alkyl, lower alkenyl or lower cycloalkylmethyl; $R_3$ is hydrogen or alkyl of from 1 to 7 carbons atoms; $R_5$ is hydrogen or methyl; $R_6$ is phenyl, lower alkyl, phenyl lower alkyl or lower alkenyl; and Y is etheno or ethano. Suitable lower alkyl and lower alkanoyl groups contemplated by the present invention are those having from 1 to 4 carbon atoms such as methyl, ethyl, isopropyl, n-butyl, formyl, acetyl, propionyl, isobutyryl, etc. Typical alkyl groups of from 1 to 7 carbon atoms are, for example, methyl, ethyl, n-propyl, n-butyl, isoamyl, sec.-hexyl, n-heptyl, etc. Suitable lower alkenyl groups are those having up to about 6 carbon atoms such as, for example, allyl methallyl, dimethallyl, and the like. Suitable lower cycloalkylmethyl groups are those having from 4 to 7 carbon atoms such as cyclopropylmethyl, cyclobutylmethyl, cyclopentylmethyl, etc. Phenyl lower alkyl is exemplified by benzyl, α-phenylethyl, β-phenylethyl, and the like.

DETAILED DESCRIPTION OF THE INVENTION

The novel compounds of the present invention are generally obtainable as crystalline materials having characteristic melting points and absorption spectra. They are appreciably soluble in many organic solvents such as ethanol, chloroform, benzene, ethyl acetate, and the like. They are, however, generally insoluble in water.

The organic bases of this invention form non-toxic acid-addition salts with a variety of organic and inorganic salt-forming agents. Thus, acid-addition salts, formed by admixture of the organic free base with an equivalent amount of an acid, suitably in a neutral solvent, are formed with such acids as sulfuric, phosphoric, hydrochloric, hydrobromic, citric, lactic, tartaric, acetic, gluconic, ascorbic, and the like. Also inluded within the purview of the present invention are the alkali metal salts (e.g., sodium and potassium) of the organic free bases when $R_1$ in the above general formula is hydrogen. For purposes of this invention, the organic free bases are equivalent to the non-toxic acid-addition salts and their alkali metal salts.

The novel substituted 7-acryloyl-7,8-dihydro-6-(hydroxy or methoxy)-6,14-endo(etheno or ethano)codides and morphides (I) of the present invention may be readily prepared from either an appropriately substituted 7-[di(lower alkoxy)methyl]-7,8-dihydro-6-(hydroxy or methoxy)-6,14-endo(etheno or ethano)codide or morphide (II) or an appropriately substituted 7-(1-alkoxy-1-alken-1-yl)-7,8-dihydro-6-(hydroxy or methoxy)-6,14-endo(etheno or ethano)codide or- morphide (III) in accordance with the following reaction scheme:

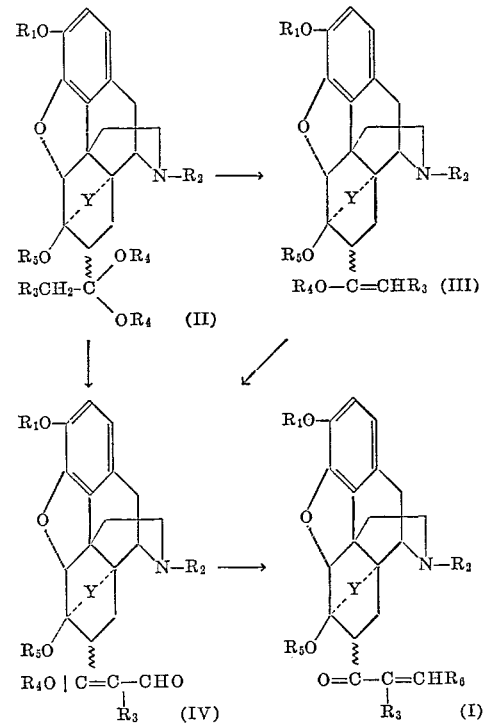

wherein $R_1$, $R_2$, $R_3$, $R_5$, $R_6$ and Y are as previously defined and $R_4$ is lower alkyl. By this procedure, a 7-[di(lower alkoxy)methyl] derivative (II), prepared as described in our copending application Ser. No. 671,128, filed Sept. 27, 1967, is treated with a formylating agent followed by hydrolysis, and the corresponding intermediate 7-(2-formyl-1-alkoxyvinyl)-7,8-dihydro-6-(hydroxy or methoxy)-6,14-endo(etheno or ethano)codide or morphide (IV) is isolated directly. Alternatively a suitably substituted 7-(1-alkoxy-1-alken-1-yl) derivative (III), prepared as described in our copending application Ser. No. 671,106, filed Sept. 27, 1967, may be converted to the corresponding intermediate (IV) by formylation and hydrolysis. By this latter route, the 7-(1-alkoxy-1-alken-1-yl) derivatives (III) are also considered to be intermediates which may be isolated and purified or which may be prepared in situ and formylated without isolation or purification depending upon the circumstances.

The formylating reagent is prepared by treating a substituted formamide such as N,N-dimethylformamide, N,N-diethylformamide, N-formylpiperidine, N-formylmorpholine, N-methylformanilide, and the like, with phosgene, phosphoryl chloride or thionyl chloride in an inert solvent such as methylene chloride, ethylene chloride or chloroform. Alternatively, an excess of the substituted formamide may be used as the solvent. The formylation reaction (II→IV or III→IV) is also most conveniently carried out in an inert solvent such as methylene chloride, ethylene chloride, chloroform, or an excess of the substituted formamide employed to prepare the formylating reagent. The temperature range for the formylation reaction is from about 0° C. to about 35° C. although room temperature is preferred. The hydrolysis step may be carried out with dilute acid or dilute alkali but preferably with aqueous sodium acetate. When the formylation reaction is substantially complete (usually from several minutes to several hours or more), the reaction mixture is stirred with aqueous sodium acetate for from several minutes to several hours at room temperature and the product (IV) is isolated.

The above described formylating reaction may be considered to be effected via formylating reagent such as that shown by compound (V), the formylating reagent formed from N,N-dimethylformamide and phosgene. This formylating reagent

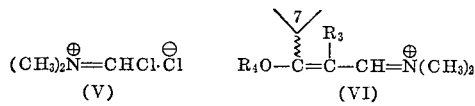

then reacts with the ketal (II), or the enol-ether (III), to form an iminium intermediate (VI) (partial structure only shown) which is converted by hydrolysis to the corresponding intermediate 7-(2-formyl-1-alkoxyvinyl) derivative (IV).

The conversion of the intermediate 7-(2-formyl-1-alkoxyvinyl) derivatives (IV) to the novel compounds of the present invention (I) may be readily carried out by treating a 7-(2-formyl-1-alkoxyvinyl) derivative (IV) with a Grignard reagent prepared from the appropriate halide $R_6X$, where $R_6$ is as previously defined and X is halogen. Other organo-metal reagents such as methyl lithium, phenyl lithium, and the like ($R_6$—Li) are also useful for this conversion. This reaction may be readily carried out in a solvent such as diethyl ether at a temperature of from about 0° C. to about 80° C. over a period of time of from about 15 minutes to about 3 hours or more, when the reaction is substantially complete. Decomposition of the organo-metal complex, using standard procedures well known to the art, then produces an intermediate secondary alcohol (VII)

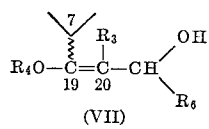

(partial structure only shown) which is immediately converted to the corresponding substituted 7-acryloyl-7,8-dihydro-6-(hydroxy or methoxy)-6,14-endo(etheno or ethano)codides and morphides (I) of the present invention upon treatment with dilute acid for a few minutes at room temperature.

The novel products of the present invention are useful and valuable as analgesic agents which may show a variety of types of analgesic activity within the general scope of analgesic or anti-nociperceptive actions. These include morphine-like modes of action; non-narcotic analgesic modes of action; and analgesic antagonist modes of action. The over-all analgesic activity of a given compound within the scope of the present invention may be readily determined by applying one or more of the routine tests described hereinbelow. The specific type of analgesic activity of a given compound may then be judged by those skilled in the art from the combined results of these several test procedures.

The substituted 7-acryloyl-7,8-dihydro-6-(hydroxy or methoxy)-6,14-endo(etheno or ethano)codides and morphides (I) of the present invention are active analgesics when measured by the "writhing syndrome" test for analgesic activity as described by Siegmund et al., Proc. Soc. Exptl. Biol. Med., vol. 9, p. 729 (1957), with modifications. This method is based upon the reduction of the number of writhes following the intraperitoneal injection of one mg./kg. of body weight of phenyl-p-quinone in male Swiss Albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less. In a representative operation, and merely by way of illustration, 7α - crotonoyl - 6,7,8,14 - tetrahydro - 6,14 - endoethenothebaine, 7α - (2 - pentenoyl) - 6,7,8,14 - tetrahydro - 6,14 - endoethenothebaine and 7α - (2 - hexenoyl) - 6,7,8,14-tetrahydro-6,14-endoethenothebaine all showed analgesic activity when tested by this procedure at an oral dose of 25 mg./kg. of body weight. If desired, the median effective dose ($ED_{50}$) for any particular compound may be calculated from the results obtained by repeating this test in multiple groups of two mice each at each of several graded dose levels.

A supplementary procedure which generally indicates a morphine-like mode of action is the rat tail-flick method described by F. E. D'Amour and D. L. Smith, J. Pharmacol. Exptl. Therap., vol. 72, p. 74 (1941), with modifications. The compounds (generally as hydrochloride salts in 0.9% saline) are administered subcutaneously to groups of 5 rats each. Graded doses are given to several groups of rats. These rats are then individually subjected to the heat stimulus from a spot light lamp and a condensing lens focused on the blackened tip of the rat tail. The characteristic response to this presumably painful heat stimulus is to flick the tail out of the concentrated beam of the heat source. The response time (in seconds) is measured for control and treated groups, and the criterion of analgesic is an approximate 100% increase in response time over controls. Established clinically active analgesics such as meperidine, codeine, morphine, etc., are active in the above test. When tested by this procedure, certain compounds of the present invention show this type of analgesic action. For example, 7α-crotonoyl-6,7,8,14-tetrahydro-6,14-endoethenothebaine, 7α-(2-pentenoyl)-6,7,8,14-tetrahydro - 6,14 - endoethenothebaine and 7α - (2 - hexenoyl) - 6,7,8,14 - tetrahydro - 6,14 - endoethenothebaine all show morphine-like analgesic activity when so tested. The median effective dose ($ED_{50}$) of these three compounds is ca 4 mg./kg., ca. 0.5 mg./kg. and ca. 0.1 mg./kg. (respectively) of body weight subcutaneously.

Additionally, supplementary routine tests known to those skilled in the art may be carried out to assess the importance of side effects frequently associated with the morphine-like analgesics. These include such actions as onset and duration of action, development of tolerance, respiratory depression, addiction liability, relative effects by oral and parenteral administration, and inhibitory effects on the gastro-intestinal system.

Other compounds of this invention may show analgesic antagonist activity when tested against a selected dose of morphine or other morphine-like agents. This antagonist activity may be considered useful as a specific antidote for an overdose of a morphine-like agent, or for its non-narcotic analgesic action. Experience has shown that such narcotic antagonists are also capable of relieving pain despite the fact that they are generally inactive in the rat tail-flick procedure (see above), and have little or no addiction hazard; see L. S. Harris and A. K. Pierson, J. Pharmacol. Exptl. Therap., vol. 143, p. 141 (1964). Analgesics which produce satisfactory pain-relief without serious side effects, particularly with regard to the tolerance, habituation and drug dependence of the opiates, have been sought for many years.

In addition, supplementary test procedures such as measuring the elevation of the pain threshold of rat paws inflamed with brewer's yeast may be carried out to confirm the analgesic action of the novel compounds of the present invention. In certain cases, these compounds also show anti-inflammatory activity.

When mixed with suitable excipients or diluents, the compounds of this invention can be prepared as pills, capsules, tablets, powders, solutions, suspensions and the like for unit dosage and to simplify administration. As analgesics, they will relieve pain by direct action on the nerve centers or by diminishing the conductivity of the sensory nerve fibers. The novel compounds of the present invention may also be administered in combination therapy with salicylates such as aspirin and the like.

The novel compounds of the present invention may exist in several isomeric forms such as stereoisomers. It is to be understood that the present invention includes within its scope all such isomeric forms. For example, the codides used as starting materials have several asymmetric carbon atoms, and epimers at the C-7 asymmetric center are possible. Formation of stereoisomers, or epimers, at C-7 is therefore possible in the products of this invention. The nuclear magnetic resonance spectra of these 7α- and 7β-acryloyl-7,8-dihydro-6-(hydroxy or methoxy)-6,14-endo(etheno or ethano)codides and morphides are particularly helpful in characterizing the mixtures of epimers or the substantially pure stereoisomers as obtained from the reaction mixtures or from subsequent purifications and separations. These isomers may then be separated by methods (such as fractional crystallization and partition-chromatography) well known to those skilled in the art. In addition, cis-trans isomers are possible at the C-20,21 double bond. All such stereoisomeric forms of the substituted 7-acryloyl-7,8-dihydro-6-(hydroxy or methoxy)-6,14-edno(etheno or ethano)codides and morphides are, therefore, included within the purview of the present invention.

In accordance with accepted convention, an α-substituent at the 7-position is behind the plane of the paper whereas a β-substituent at the 7-position is in front of the plane of the paper. This is usually represented by a ---- bond for an α-substituent, a — bond for a β-substituent, and a ∼ bond where both are indicated.

The invention will be described in greater detail in conjunction with the following specific examples.

Example 1

Preparation of 7α-(2-formyl-1-methoxyvinyl)-6,7,8,14-tetrahydro-6,14-endoethenothebaine.—A solution of phosgene (20 g.) in methylene chloride (200 ml.) is added rapidly dropwise with stirring to a mixture of dimethyl formamide (200 ml.; dried over molecular sieves) and methylene chloride (600 ml.). The mixture is stirred for a further 15 minutes after the addition is complete. A solution of 7α-(1,1-dimethoxyethyl)-6,7,8,14-tetrahydro-6,14-endoethenothebaine (19.4 g.) in methylene chloride (200 ml.) and pyridine (10 ml.) is then added in a slow stream and the mixture is stirred for 45 minutes. Aqueous sodium acetate (1200 ml.; 5%) is then added and the mixture is stirred vigorously for 30 minutes. If necessary, the mixture is adjusted to pH 8 by the addition of aqueous sodium bicarbonate and the layers are separated. The aqueous layer is washed with methylene chloride and is then made strongly alkaline with sodium hydroxide solution (10%). The mixture is extracted with ether and the extract is washed with water and dried. Evaporation of solvent followed by crystallization of the residue from acetone-n-hexane gives 7α-(2-formyl-1-methoxy-vinyl)-6,7,8,14-tetrahydro-6,14-endoethenothebaine (15.37 g.), M.P. 152–153° C. A further amount (1.42 g.), M.P. 150–152° C., is obtained from the mother liquor to give a total yield of 87%.

Example 2

Preparation of 7α-crotonoyl-6,7,8,14-tetrahydro-6,14-endoethenothebaine.—Lithium (100 mg.) is added in small pieces to a stirred suspension of 7α-(2-formyl-1-methoxyvinyl)-6,7,8,14-tetrahydro-6,14-endoethenothebaine (1 g.) in diethyl ether (20 ml.) and methyl iodide (5 ml.). After 30 minutes the lithium has all reacted, and water is added. The layers are separated, and the organic layer is washed with water, dried over anhydrous sodium sulfate, and evaporated. The residue is dissolved in dilute hydrochloric acid (5%) and, after several minutes, the solution is neutralized with saturated aqueous sodium bicarbonate solution. The mixture is extracted with methylene chloride and the extract is washed with water, dried over anhydrous sodium sulfate, and evaporated. A solution of the residue in methylene chloride is passed through a short column of Magnesol® and evaporation of the eluate followed by crystallization of the residue from acetone-n-hexane gives 7α-crotonoyl-6,7,8,14-tetrahydro-6,14-endoethenothebaine (770 mg.), M.P., 107–110° C.

Example 3

Preparation of 7α-(2-pentenoyl)-6,7,8,14-tetrahydro-6,14-endoethenothebaine.—By a similar process to that in Example 2, 7α-(2-formyl-1-methoxyvinyl)-6,7,8-14-endoethenothebaine is treated with ethyl lithium (from lithium and ethyl bromide) in ether. The reaction mixture is worked up as previously described, and the crude residue is treated with dilute hydrochloric acid to give 7α-(2-pentenoyl)-6,7,8-14-tetrahydro-6,14-endoethenothebaine, M.P. 103–105° C., after purification and crystallization from hexane.

Example 4

Preparation of 7α-(2-hexenoyl)-6,7,8,14-tetrahydro-6,14-endoethenothebaine.—By a similar process to that in Example 2, 7α-(2-formyl-1-methoxyvinyl)-6,7,8,14-tetrahydro-6,14-endoethenothebaine is treated with propyl lithium (from lithium and propyl bromide) in ether. The reaction mixture is worked up as previously described, and the crude residue is treated with dilute hydrochloric acid, to give 7α-(2-hexenoyl)-6,7,8,14-tetrahydro-6,14-endoethenothebaine, M.P. 65–69° C., after purification and crystallization from petroleum ether.

Example 5

Preparation of 7α-(4-methyl-2-pentenoyl)-6,7,8,14-tetrahydro-6,14-endoethenothebaine.—Following the general procedure of Example 2, 7α-(2-formyl-1-methoxyvinyl)-6,7,8,14-tetrahydro-6,14-endoethenothebaine is treated with iso-propyl lithium (from lithium and iso-propyl bromide) in ether and then with dilute hydrocloric acid to give 7α-(4-methyl-2-pentenoyl)-6,7,8,14-tetrahydro-6,14-endoethenothebaine.

Example 6

Preparation of 7α-(2-heptenoyl)-6,7,8,14-tetrahydro-6,14-endoethenothebaine.—Following the general procedure of Example 2, 7α-(2-formyl-1-methoxyvinyl)-6,7,8,14-tetrahydro-6,14-enloethenothebaine is treated with butyl lithium (from lithium and butyl bromide) in ether and then with dilute hydrochloric acid to give 7α-(2-heptenoyl)-6,7,8-14-tetrahydro-6,14-endoethenothebaine.

Example 7

Preparation of 7α-(2-octenoyl)-6,7,8,14-tetrahydro-6,14-endoethenothebaine.—Following the general procedure of Example 2, 7α-(2-formyl-1-methoxyvinyl)-6,7,8,14-tetrahydro-6,14-endoethenothebaine is treated with amyl lithium (from lithium anl amyl bromide) in ether and then with dilute hydrochloric acid to give 7α-(2-octenoyl)-6,7,8,14-tetrahydro-6,14-endoethenothebaine.

Example 8

Preparation of 7α-(2,4-hevadienoyl)-6,7,8,14-tetrahydro-6,14-endoethenothebaine.—Following the general procedure of Example 2, 7α-(2-formyl-1-methoxyvinyl)-6,7,8,14-tetrahydro-6,14-endoethenothebaine is treated with allyl lithium (from lithium and allyl bromide) in ether and then with dilute hydrochloric acid to give 7α-(2,4-hexadienoyl)-6,7,8,14-tetrahydro-6,14-endoethenothebaine.

Example 9

Preparation of 7α-cinnamoyl-6,7,8,14-tetrahydro-6,14-endothenothebaine.—Following the general procedure of Example 2, 7α-(2-formyl-1-methoxyvinyl)-6,7,8,14-tetrahydro-6,14-endoethenothebaine is treated with benzyl lithium (from lithium and benzyl bromide) in ether and then with dilute hydrochloric acid to give 7α-cinnamoyl-6,7,8,14-tetrahydro-6,14-endoethenothebaine.

Example 10

Preparation of 7α-(5-phenyl-2-pentenoyl)-6,7,8,14-tetrahydro-6,14-endoethenothebaine.—Following the general procedure of Example 2, 7α-(2-formyl-1-methoxyvinyl) - 6,7,8,14 - tetrahydro - 6,14 - endoethenothebaine is treated with phenethyl lithium (from lithium and phenethyl bromide) in ether and then with dilute hydrochloric acid to give 7α-(5-phenyl-2-pentenoyl)-6,7,18,14-tetrahylro-6,14-endoethenothebaine.

Example 11

Preparation of N-cyclopropylmethyl-7α-(2-pentenoyl)-6,7,8,14 - tetrahydro - 6,14 - endoethenonorthebaine.— Following the general procedure of Example 2, N-cyclopropylmethyl - 7α -(2 - formyl - 1 - methoxyvinyl) - 6,7,8,14-tetrahydro-6,14-endoethenonorthebaine is treated with ethyl lithium (from lithium and ethyl bromide) in ether and when with dilute hydrochloric acid to give N - cyclopropylmethyl - 7α - (2 - pentenoyl) - 6,7,8,14-tetrahydro-6,14-endoethenonorthebaine, M.P. 93–95° C.

Example 12

Preparation of N-cyclopropylmethyl-7α-(2-pentenoyl)-6,7,8,14 - tetrahydro - 6,14 - endoethenonororipavine.— Following the general procedure of Example 2, N-cyclopropylmethyl - 7α - (2 - formyl - 1 - methoxyvinyl) - 6,7,8,14-tetrahydro-6,14-endoethenonororipavine is treated with lithium ethyl (from lithium and ethyl bromide) in ether and then with dilute hydrochloric acid to give N-cyclopropylmethyl - 7α - (2 - pentenoyl) - 6,7,8,14 -tetrahydro-6,14-endoethenonororipavine.

Example 13

Preparation of 7α-crotonoyl-6,7,8,14-tetrahydro-6,14-endoethenooripavine.—Following the general procedure of Example 2, 7α-(2-formyl-1-methoxyvinyl)-6,7,8,14-tetrahydro-6,14-endoethenooripavine is treated with methyl lithium (from lithium and methyl iodide )in ether and then with dilute hydrochloric acid to give 7α-crotonoyl-6,7,8,14-tetrahydro-6,14-endoethenooripavine.

Example 14

Preparation of 3-acetyl-7α-crotonoyl-6,7,8,14-tetrahydro - 6,14 - endoethenooripavine. — 7α - crotonoyl - 6,7,8,14-tetrahydro-6,14-endoethenooripavine is treated with acetic anhydride in pyridine to give 3-acetyl-7α-crotonoyl-6,7,8,14-tetrahydro-6,14-endoethenooripavine.

Example 15

Preparation of 7α-(2-pentenoyl)-6,7,8,14-tetrahydro-6,14-endoethenonorthebaine.—Following the general procedure of Example 2, 7α-(2-formyl-1-methoxyvinyl)-6,7,8,14-tetrahydro-6,14-endoethenonorthebaine is treated with ethyl lithium (from lithium and ethyl bromide) in ether and then with dilute hydrochloric acid to give 7α-(2-pentenoyl) - 6,7,8,14 - tetrahydro - 6,14 - endoethenonorthebaine.

Example 16

Preparation of N-allyl-7α(2-pentenoyl)-6,7,8,14-tetrahydro-6,14-endoethenonorthebaine.—Following the general procedure of Example 2, N-allyl-7α-(2-formyl-1-methoxyvinyl - 6,7,8,14 - tetrahydro - 6,14 - endoethenonorthebaine is treated with ethyl lithium (from lithium and ethyl bromide) in ether and then with dilute hydrochloric acid to give N-allyl-7α-(2-pentenoyl)-6,7,8,14-tetrahydro-6,14-endoethenonorthebaine.

Example 17

Preparation of N-propyl-7α-(2-pentenoyl)-6,7,8,14-tetrahydro - 6,14 - endoethenonorthebaine. — Following the general procedure of Example 2, 7α-(2-formyl-1-methoxyvinyl) - N - propyl - 6,7,8,14 - tetrahydro - 6,14 - endoethenonorthebaine is treated with ethyl lithium (lithium and ethyl bromide) in ether and then with dilute hydrochloric acid to give N-propyl-7α-(2-pentenoyl)-6,7,8,14-tetrahydro-6,14-endoethenonorthebaine.

Example 18

Preparation of N-phenethyl-7α-(2-pentenoyl)-6,7,8,14-tetrahydro-6,14-endoethenonorthebaine. — Following the general procedure of Example 2, 7α-(2-formyl-1-methoxyvinyl) - N - phenethyl - 6,7,8,14 - tetrahydro - 6,14 - endoethenonorthebaine is treated with ethyl lithium (from lithium and ethyl bromide) in ether and then with dilute hydrochloric acid to give N-phenethyl-7α-(2-pentenoyl)-6,7,8,14-tetrahydro-6,14-endoethenonorthebaine.

Example 19

Preparation of N-(3-methyl-2-buten-1-yl)-7α-(2-pentenoyl) - 6,7,8,14 - tetrahydro - 6,14 - endoethenonorthebaine.—Following the general procedure of Example 2, 7α - (2 - formyl - 1 - methoxyvinyl) - N - (3 - methyl - 2-buten - 1 - yl) - 6,7,8,14 - tetrahydro - 6,14 - endoethenonorthebaine is treated with ethyl lithium (from lithium and ethyl bromide) in ether and then with dilute hydrochloric acid to give N-(3-methyl-2-buten-1-yl)-7α-(2-pentenoyl)-6,7,8,14-tetrahydro-6,14-endoethenonorthebaine.

Example 20

Preparation of 7α - (2 - pentenoyl) - N - propargyl-6,7,8,14 - tetrahydro - 6,14 - endoethenonorthebaine.— Following the general procedure of Example 2, 7α-(2-formyl - 1 - methoxyvinyl) - N - propargyl - 6,7,8,14-tetrahydro - 6,14 - endoethenonorthebaine is treated with ethyl lithium (from lithium and ethyl bromide) in ether and then with dilute hydrochloric acid to give 7α-(2-pentenoyl) - N - propargyl - 6,7,8,14 - tetrahydro - 6,14-endoethenonorthebaine.

Example 21

Preparation of 7α - (2 - ethylcrotonoyl) - 6,7,8,14-tetrahydro - 6,14 - endoethenothebaine.—Following the general procedure of Example 2, 7α-(2-formyl-1-methoxy - 1 - butenyl) - 6,7,8,14 - tetrahydro - 6,14 - endoethenothebaine is treated with methyl lithium (from lithium and methyl iodide) in ether and then with dilute hydrochloric acid to give 7α-(2-ethylcrotonoyl)-6,7,8,14-tetrahydro - 6,14 - endoethenothebaine.

Example 22

Preparation of 7α - (2 - pentenoyl) - 6,7,8,14 - tetrahydro - 6,14 - endoethanothebaine.—Following the general procedure of Example 2, 7α-(2-formyl-1-methoxyvinyl) - 6,7,8,14 - tetrahydro - 6,14 - endoethanothebaine is treated with ethyl lithium (from lithium and ethyl bromide) in ether and then with dilute hydrochloric acid to give 7α - (2 - pentenoyl) - 6,7,8,14 - tetrahydro-6,14-endoethanothebaine.

Example 23

Preparation of 7β - (2 - pentenoyl) - 6,7,8,14 - tetrahydro - 6,14 - endoethenothebaine.—Following the general procedure of Example 2, 7β-(2-formyl-1-methoxyvinyl) - 6,7,8,14 - tetrahydro - 6,14 - endoethenothebaine is treated with ethyl lithium (from lithium and ethyl bromide) in ether and then with dilute hydrochloric acid to give 7β - (2 - pentenoyl) - 6,7,8,14 - tetrahydro - 6,14-endoethenothebaine.

Example 24

Preparation of 7α - crotonoyl - 7,8 - dihydro - 6 - hydroxy - 6,14 - endoethenocodide.—Following the general procedure of Example 2, 7α-(2-formyl-1-methoxyvinyl)-7,8 - dihydro - 6 - hydroxy - 6,14 - endoethenocodide is treated with methyl lithium (from lithium and methyl iodide) in ether and then with dilute hydrochloric acid to give 7α - crotonoyl - 7,8 - dihydro - 6 - hydroxy - 6,14-endoethenocodide.

Example 25

Preparation of N - cyclopropylmethyl - 7α - crotonoyl-6,7,8,14 - tetrahydro - 6,14 - endoethenonorthebaine.—Following the general procedure of Example 2, N-cyclopropylmethyl - 7α - (2 - formyl - 1 - methoxyvinyl)-6,7,8,14 - tetrahydro - 6,14 - endoethenonorthebaine is treated with methyl lithium (from lithium and methyl iodide) in ether and then with dilute hydrochloric acid to give N - cyclopropylmethyl - 7α - crotonoyl - 6,7,8,14-tetrahydro-6,14-endoethenonorthebaine.

Example 26

Preparation of N - cyclopropylmethyl - 7α - crotonoyl-6,7,8,14 - tetrahydro - 6,14 - endoethenonororipavine.—Following the general procedure of Example 2, N-cyclopropylmethyl - 7α - (2 - formyl - 1 - methoxyvinyl)-6,7,8,14 - tetrahydro - 6,14 - endoethenonororipavine is treated with methyl lithium (from lithium and methyl iodide) in ether and then with dilute hydrochloric acid to give N - cyclopropylmethyl - 7α - crotonoyl - 6,7,8,14-tetrahydro-6,14-endoethenonororipavine.

Example 27

Preparation of 7α - (2 - formyl - 1 - methoxyvinyl)-6,7,8,14 - tetrahydro - 6,14 - endoethenothebaine.—A solution of phosgene (20 g.) in methylene chloride (200 ml.) is added rapidly dropwise with stirring to a mixture of dimethyl formamide (200 ml.; dried over molecular sieves) and methylene chloride (600 ml.). The mixture is stirred for a further 15 minutes after the addition is complete. A solution of 7α - (1,1 - dimethoxyethyl)-6,7,8,14 - tetrahydro - 6,14 - endoethenothebaine (19.4 g.) in methylene chloride (200 ml.) and pyridine (10 ml.) is then added in a slow stream and the mixture is stirred for 45 minutes. Aqueous sodium acetate (1200 ml.; 5%) is then added and the mixture is stirred vigorously for 30 minutes. If necessary, the mixture is adjusted to pH 8 by the addition of aqueous sodium bicarbonate and the layers are separated. The aqueous layer is washed with methylene chloride and is then made strongly alkaline with sodium hydroxide solution (10%). The mixture is extracted with ether and the extract is washed with water and dried. Evaporation of solvent followed by crystallization of the residue from acetone-n-hexane gives 7α - (2 - formyl - 1 - methoxyvinyl) - 6,7,8,14 - tetrahydro - 6,14 - endoethenothebaine (15.37 g.), M.P. 152–153° C. A further amount (1.42 g.), M.P. 150–152° C., is obtained from the mother liquor to give a total yield of 87%.

Example 28

Preparation of N - cyclopropylmethyl - 7α - (2 - formyl - 1 - methoxyvinyl) - 6,7,8,14 - tetrahydro - 6,14-endoethenonorthebaine hydrochloride.—A solution of phosgene (1 g.) in methylene chloride (10 ml.) is added rapidly dropwise with stirring to a mixture of dimethylformamide (10 ml.; dried over molecular sieves) and methylene chloride (30 ml.). The mixture is stirred for a further 15 minutes after the addition is complete. A solution of N - cyclopropylmethyl - 7α - (1,1 - dimethoxyethyl) - 6,7,8,14 - tetrahydro - 6,14 - endoethenonorthebaine (1 g.) in methylene chloride (10 ml.) and pyridine (0.5 ml.) is then added in a slow stream, and the mixture is stirred at room temperature for 45 minutes. Aqueous sodium hydroxide (60 ml.; 5%) is then added, and the mixture is stirred vigorously for 30 minutes. The layers are separated and the organic phase is washed with water and dried. The oil obtained by evaporation of solvent is dissolved in dilute hydrochloric acid (5%), and the solution is washed with ether and extracted with methylene chloride. The extract is dried and evaporated. Acetone is added to cause crystallization and the material is collected with the aid of ether to give N-cyclopropylmethyl - 7α - (2 - formyl - 1 - methoxyvinyl) - 6,7,8,14 - tetrahydro - 6,14 - endoethenonorthebaine hydrochloride (835 mg.), M.P. 213–215° C.

Example 29

Preparation of N - cyclopropylmethyl - 7α - (2 - formyl - 1 - methoxyvinyl) - 6,7,8,14 - tetrahydro - 6,14-endoethenonororipavine.—Following the general procedure of Example 28, N-cyclopropylmethyl-7α-(1,1-dimethoxyethyl) - 6,7,8,14 - tetrahydro - 6,14 - endoethenonoripavine is treated with phosgene-dimethylformamide followed by hydrolysis to give N-cyclopropylmethyl-7α-(2 - formyl - 1 - methoxyvinyl) - 6,7,8,14 - tetrahydro-6,14-endoethenonororipavine.

Example 30

Preparation of 7α - (2 - formyl - 1 - methoxyvinyl)-6,7,8,14 - tetrahydro - 6,14 - endoethenooripavine.—Following the general procedure of Example 28, 7α-(1,1-dimethoxyethyl) - 6,7,8,14 - tetrahydro - 6,14 - endoethenooripavine is treated with phosgene-dimethylformamide followed by hydrolysis to give 7α-(2-formyl-1-methoxyvinyl) - 6,7,8,14 - tetrahydro - 6,14 - endoethenooripavine.

Example 31

Preparation of 7α - (2 - formyl - 1 - methoxyvinyl)-6,7,8,14 - tetrahydro - 6,14 - endoethenonorthebaine.—Following the general procedure of Example 28, 7α-(1,1-dimethoxyethyl) - 6,7,8,14 - tetrahydro - 6,14 - endoethenonorthebaine is treated with phosgene-dimethylformamide followed by hydrolysis to give 7α-(2-formyl-1 - methoxyvinyl) - 6,7,8,14 - tetrahydro - 6,14 - endoethenonorthebaine.

Example 32

Preparation of N-allyl-7α-(2-formyl-1-methoxyvinyl)-6,7,8,14 - tetrahydro-6,14-endoethenonorthebaine.—Following the general procedure of Example 27, N-allyl-7α-(1,1 - dimethoxyethyl)-6,7,8,14-tetrahydro-6,4-endoethenonorthebaine is treated with phosgene-dimethylformamide followed by hydrolysis to give N-allyl-7α-(2-formyl - 1 - methoxyvinyl) - 6,7,8,14 - tetrahydro-6,14-endoethenonorthebaine.

Example 33

Preparation of 7α-(2-formyl - 1 - methoxyvinyl)-N-propyl - 6,7,8,14 - tetrahydro - 6,14 - endoethenonorthebaine.—Following the general procedure of Example 27, 7α-(1,1-dimethoxyethyl)-N-propyl - 6,7,8,14 - tetrahydro-6,14-endoethenonorthebaine is treated with phosgene-dimethylformamide followed by hydrolysis to give 7α-(2- formyl-1-methoxyvinyl)-N-propyl - 6,7,8,14 - tetrahydro-6,14-endoethenonorthebaine.

Example 34

Preparation of 7α-(2-formyl - 1 - methoxyvinyl)-N-phenethyl-6,7,8,14-tetrahydro - 6,14 - endoetheneorthebaine.—Following the general procedure of Example 27, 7α-(1,1-dimethoxyethyl)-N-phenethyl - 6,7,8,14 - tetrahydro-6,14-endoethenonorthebaine is treated with phosgene-dimethylformamide followed by hydrolysis to give 7α-(2-formyl - 1 - methoxyvinyl)-N-phenethyl-6,7,8,14-tetrahydro-6,14-endoethenonorthebaine.

Example 35

Preparation of 7α-(2-formyl - 1 - methoxyvinyl)-N-(3-methyl - 2 - buten-1-yl)-6,7,8,14-tetrahydro-6,14-endoethenonorthebaine.—Following the general procedure of Example 27, 7α-(1,1-dimethoxyethyl) - N - (3-methyl-2-buten-1-yl)-6,7,8,14-tetrahydro - 6,14 - endoethenonorthebaine is treated with phosgene-dimethylformamide followed by hydrolysis to give 7α-(2-formyl-1-methoxyvinyl) - N - (3-methyl-2-buten-1-yl)-6,7,8,14-tetrahydro-6,14-endoethenonorthebaine.

Example 36

Preparation of 7α-(2-formyl - 1 - methoxyvinyl)-N-propargyl-6,7,8,14-tetrahydro - 6,14 - endoethenonorthebaine.—Following the general procedure of Example 27, 7α-(1,1-dimethoxyethyl) - N - propargyl-6,7,8,14-tetrahydro-6,14-endoethenonorthebaine is treated with phosgene-dimethylformamide followed by hydrolysis to give 7α-(2-formyl-1-methoxyvinyl) - N - propargyl-6,7,8,14-tetrahydro-6,14-endoethenonorthebaine.

Example 37

Preparation of 7α-(2-formyl - 1 - methoxy-1-butenyl)-6,7,8,14-tetrahydro - 6 ,14 - endoethenonthebaine.—Following the general procedure of Example 27, 7α-(1,1-dimethoxybutyl) - 6,7,8,14 - tetrahydro - 6 ,14 - endoethenothebaine is treated with phosgene-dimethylformamide followed by hydrolysis to give 7α-(2-formyl-1-methoxy-1-butenyl)6,7,8,14-tetrahydro - 6,14 - endoethenothebaine.

Example 38

Preparation of 7α-(2-formyl - 1 - methoxyvinyl)-6,7,8,14-tetrahydro - 6,14 - endoethanothebaine.—Following the general procedure of Example 27, 7α-(1,1-dimethoxyethyl)-6,7,8,14-tetrahydro - 6 ,14 - endoethanoethebaine is treated with phosgene-dimethylformamide followed by hydrolysis to give 7α-(2-formyl - 1 - methoxyvinyl)-6,7,8,14-tetrahydro-6,14-endoethanothebaine.

Example 39

Preparation of 7β-(2-formyl - 1 - methoxyvinyl)-6,7,8,14-tetrahydro-6,14-endoethenothebaine.—Following the general procedure of Example 27, 7β-(1,1-dimethoxyethyl)-6,7,8,14-tetrahydro - 6,14 - endoethenothebaine is treated with phosgene-dimethylformamide followed by hydrolysis to give 7β-(2-formyl - 1 - methoxyvinyl)-6,7,8,14-tetrahydro-6,14-endoethenothebaine.

Example 40

Preparatio nof 7α-(2-formyl - 1 - methoxyvinyl)-7,8-dihydro - 6 - hydroxy-6,14-endoethenocodide.—Following the general procedure of Example 27, 7α-(1,1-dimethoxyethyl) - 7,8 - dihydro-6-hydroxy - 6,14 - endoethenocodide is treated with phosgene-dimethylformamide followed by hydrolysis to give 7α-(2-formyl-1-methoxyvinyl)-7,8-dihydro - 6 - hydroxy - 6,14 - endoethenocodide.

We claim:
1. A compound selected from the group consisting of those of the formula:

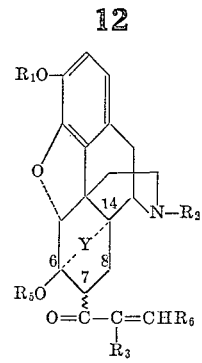

wherein $R_1$ is selected from the group consisting of hydrogen, lower alkyl and lower alkanoyl; $R_2$ is selected from the group consisting of hydrogen, cyano, propargyl, lower alkyl, phenyl lower alkyl, lower alkenyl and lower cycloalkylmethyl; $R_3$ is selected from the group consisting of hydrogen and alkyl of from 1 to 7 carbon atoms; $R_5$ is selected from the group consisting of hydrogen and methyl; $R_6$ is selected from the group consisting of phenyl, lower alkyl, phenyl lower alkyl and lower alkenyl; and Y is selected from the group consisting of etheno and ethano; the non-toxic acid-addition salts thereof; and the alkali-metal phenolates thereof when $R_1$ is hydrogen.

2. A compound according to claim 1 wherein $R_1$, $R_2$, $R_5$ and $R_6$ are methyl; $R_3$ is hydrogen; Y is etheno; and the configuration at the 7-position is alpha.

3. A compound according to claim 1 wherein $R_1$, $R_2$, and $R_5$ are methyl; $R_3$ is hydrogen; $R_6$ is ethyl; Y is etheno; and the configuration at the 7-position is alpha.

4. A compound according to claim 1 wherein $R_1$, $R_2$ and $R_5$ are methyl; $R_3$ is hydrogen; $R_6$ is n-propyl; Y is etheno; and the configuration at the 7-position is alpha.

5. A compound according to claim 1 wherein $R_1$ and $R_5$ are methyl; $R_2$ is cyclopropylmethyl; $R_3$ is hydrogen; $R_6$ is ethyl; Y is etheno; and the configuration at the 7-position is alpha.

6. A compound according to claim 1 wherein $R_1$ and $R_3$ are hydrogen; $R_2$ is cyclopropylmethyl; $R_5$ is methyl; $R_6$ is ethyl; Y is etheno; and the configuration at the 7-position is alpha.

7. A compound according to claim 1 wherein $R_1$ and $R_3$ are hydrogen; $R_2$, $R_5$ and $R_6$ are methyl; Y is etheno; and the configuration at the 7-position is alpha.

8. A compound according to claim 1 wherein $R_1$, $R_5$ and $R_6$ are methyl; $R_2$ is cyclopropylmethyl; $R_3$ is hydrogen; Y is etheno; and the configuration at the 7-position is alpha.

9. A compound according to claim 1 wherein $R_1$ and $R_3$ are hydrogen; $R_2$ is cyclopropylmethyl; $R_5$ and $R_6$ are methyl; Y is etheno; and the configuration at the 7-position is alpha.

References Cited

UNITED STATES PATENTS 2,178,010  10/1939  Small _____ 260—285
3,285,914  11/1966  Gordon _____ 260—285
3,318,886  5/1967   Brown et al. _____ 260—285

FOREIGN PATENTS 969,263  9/1964  Great Britain.

OTHER REFERENCES

Bentley et al.: Jour. Am. Chem. Soc., vol. 89, p. 3273–80 (1967).

Bentley et al.: Jour. Am. Chem. Soc., vol. 89, 3293–3302 (1967).

DONALD G. DAUS, Primary Examiner

U.S. Cl. X.R.

260—240, 247.2, 294, 544, 562; 424—260

PO-1050
(5/69)

UNITED STATES PATENT OFFICE
CERTIFICATE OF CORRECTION

Patent No. 3,474,103              Dated October 21, 1969

Inventor(s) John Johnston Brown and Robert Allis Hardy, Jr.

It is certified that error appears in the above-identified patent and that said Letters Patent are hereby corrected as shown below:

Column 2, line 6, "inluded" should read -- included --; lines 51-53, that portion of formula (IV) reading $R_4O|C=C-CHO$ should read $R_4O-C=C-CHO$
                                                        $|$                                $|$
                                                        $R_3$                              $R_3$ Column 3, line 38, "alkoxyvinyl (derivatives" should read -- alkoxyvinyl) derivatives --. Column 5, line 47, "edno" should read -- endo --. Column 6, line 63, "hydrocloric" should read -- hydrochloric --; line 71, "enloethenothebaine" should read -- endoethenothebaine --. Column 7, line 2, "ocetnoyl" should read -- octenoyl --; line 6, "anl" should read -- and --; line 11, "hevadienoyl" should read -- hexadienoyl --; line 36, "-6,7,18,14-" should read -- -6,7,8,14- -- line 37, "lro" should read -- dro --; line 46, "when" should read -- then --. Column 8, line 12, "-7α(2-" should read -- -7α-(2- --. Column 10, line 35, "noripavine" should read -- nororipavine --. Column 11, line 5, "endoetheneorthe-" should read -- endoethenonorthe- --; line 37, "endoethenonthebaine" should read -- endoethenothebaine --; line 42, "butenyl)6,7,8,14-" should read -- butenyl)-6,7,8,14- --; line 64, "Preparatio nof" should read -- Preparation of --.

SIGNED AND
SEALED
MAY 26 1970

(SEAL)
Attest:

Edward M. Fletcher, Jr.                    WILLIAM E. SCHUYLER, JR.
Attesting Officer                          Commissioner of Patents